United States Patent [19]
Rozet

[11] 3,760,146

[45] Sept. 18, 1973

[54] PHOSPHOR BRONZE ARC WELDING ELECTRODE FOR ALTERNATING CURRENT

[75] Inventor: David Rozet, York, Pa.

[73] Assignee: Chemetron Corporation, Chicago, Ill.

[22] Filed: Oct. 14, 1971

[21] Appl. No.: 189,339

[52] U.S. Cl................. 219/146, 117/202, 117/206, 219/137
[51] Int. Cl............................................ B23k 35/22
[58] Field of Search.................... 219/137, 145, 146, 219/73, 74; 117/202-206; 148/24, 26

[56] References Cited
UNITED STATES PATENTS

| | | | |
|---|---|---|---|
| 2,440,941 | 5/1948 | Garriott | 219/146 |
| 2,463,096 | 3/1944 | Garriott | 219/146 |
| 2,817,751 | 12/1957 | Phillips | 219/146 |
| 2,626,339 | 1/1953 | Wasserman | 219/146 |
| 2,694,764 | 11/1954 | Muller | 219/146 |

OTHER PUBLICATIONS

Welding Hand Book 6th Edition Section 1 August 1969 pp. 345.

Primary Examiner—J. V. Truhe
Assistant Examiner—George A. Montanye
Attorney—Nicholas M. Esser

[57] ABSTRACT

A phosphor bronze electrode including a coating of materials having a low ionization potential, i.e., easily ionized, is disclosed which is suitable for use either with direct current or alternating current having an open circuit as low as 40 volts.

5 Claims, No Drawings

PHOSPHOR BRONZE ARC WELDING ELECTRODE FOR ALTERNATING CURRENT

BACKGROUND OF THE INVENTION

Phosphor bronze electrodes are highly desired for joining bronzes of similar composition and for welding copper, brasses and bronzes to each other, for welding them to cast iron and mild steel and also for overlying cast iron and steel. Those electrodes known to the art, however, can be used only with direct electric current, reverse polarity.

For some reason which is not fully understood, those knowledgeable in this field have apparently been unable to develop electrodes which will operate satisfactorily with alternating current much less with arc welding machines having open circuit voltages as low as 40 volts. This has been a considerable disadvantage because alternating current arc welding machines are less expensive to buy than motor generators or rectifiers, are cheaper to operate and require less maintenance and are widely used in many shops, on farms and in other locations. Alternating current welding machines may operate with power frequencies of from about 25 to about 60 cycles per second.

On an alternating current machine the current reverses direction on each one-half cycle. Phosphor bronze electrodes of known composition have proved to be unable to operate satisfactorily across the zero voltage point. This deficiency is especially serious with small alternating current machines built with open circuit voltage as low as 40 volts where the arc tends to extinguish so that the welding is intermittent or of unacceptable quality. There remains therefore the need for a phosphor bronze electrode which will operate on alternating current, especially alternating current having a low open circuit voltage, or direct current.

THE INVENTION

An electrode has now been discovered which has a phosphor bronze core and a flux coating which provides satisfactory welding with direct current or with alternating current. More particularly the electrode operates satisfactorily with alternating current at a low open circuit voltage. The electrode of this invention employs a phosphor bronze core having a low lead content and a flux coating which includes a combination of ingredients having low ionization potential, i.e., ingredients which are easily ionized. The invention also contemplates a method of welding employing such an electrode.

Broadly stated, the electrode includes a low lead phosphor bronze which alloy provides weld metal having the properties of high strength, ductility and soundness. The flux contains a substantial portion of alkali metal and alkaline earth metal carbonates, and a relatively smaller quantity of carbon. Also present to produce good wetting action, proper weld contour and high quality deposits are other ingredients known to the welding flux art such as slag forming agents, deoxidizers, binders and the like.

Phosphor bronze compositions have been classified as a specific kind of alloy in the metal arts. A table illustrating such a classification appears at page 961 in the Metals Handbook, Eighth Edition, published by the American Society for Metals. A phosphor bronze may have from about 1 percent to about 10 percent tin, a small amount of phosphorus, usually less than about 0.40 percent, manganese may be present in an amount less than about 0.25 percent, the remainder being copper. Welding electrodes according to this invention preferably have cores of phosphor bronze grade A which contains 5 percent tin and 95 percent copper or phosphor bronze grade C which contains 92 percent copper and 8 percent tin. Other suitable core materials are phosphor bronze grade D (90 Cu – 10 Sn) and grade E (98.75 Cu – 1.25 Sn). Phosphor bronze grade B which contains about 1 percent lead is not suitable for use in this invention. Copper alloys not to be confused with phosphor bronze are the various brass compositions, silicon bronzes, aluminum bronzes and copper nickel alloys.

The flux for the electrode, in addition to enabling operation on alternating current of low open circuit voltage, at least 50 volts, also produces welds which are satisfactory in that the weld metal combines the properties of high strength, ductility and soundness. The flux comprises slag forming materials selected from those of low ionization potential including compounds of cesium, potassium, sodium, barium, strontium, calcium, titanium and the like. These constituents are usually present as their carbonates and in a quantity of from about 15 percent to about 60 percent by weight. Preferably they comprise about 50 percent of the total weight of the flux. Generally, the alkaline earth metal carbonates will include more than about 5 percent calcium carbonate and more than about 20 percent of barium and/or strontium carbonate.

Other flux constituents are fluorides of sodium or calcium and silicon oxide. The fluorides dissolve impurities in the weld metal and eliminate them into the slag which they help to form. Silicon oxide is a slag former. Ferrosilicon is added for deoxidation and ferroboron provides wetting action. Alginate and/or a colloidal clay binder may be used to facilitate extrusion of the flux about the metal rod.

In addition to the above ingredients a minimum of about 2 percent carbon, such as coke or graphite, is added to the coating to increase the arc stability. The reason for the stabilizing action of the carbon is not understood but the electrode will not operate properly on low voltage alternating current with less than about 2 percent of this ingredient, nor will it operate satisfactorily with more than about 8 percent carbon in the coating. In a preferred embodiment the flux contains from about 5 percent to about 7 percent graphite by weight. The added carbon also contributes to the wetting action of the flux.

The dry ingredients are finely divided and mixed with an aqueous silicate binder containing from about 35 percent to about 45 percent solids in an amount sufficient to provide from about 15 to about 25 parts of binder per 100 parts of dry ingredients. Generally about 20 parts of silicate binder are used. Suitable binders are sodium silicate having $SiO_2$ and $Na_2O$ in the proportion of from about 2.5:1 to about 3.35:1 with a density of from about 41° to 47° Baume and potassium silicate having $SiO_2$ and $K_2O$ in the proportion of from about 1.9:1 to about 2.3:1 and a density of 40° Baume or a mixture of them.

Variations may be made in the foregoing dry ingredients and binder without departing from the spirit and scope of the present invention; for example, iron powder and/or copper powder may be included for their beneficial effects on electrode burnoff characteristics, but these are not essential ingredients in obtaining the main results of the present invention.

The flux may be applied to the phosphor bronze core by extrusion of dipping to achieve a thickness sufficient to accomplish the desired results. The quantity of flux may amount to from about 10 percent to about 25 percent of the total weight of the electrode. After the coating has been applied the electrode is baked at 600° – 800° F. to reduce the moisture content of the flux. The dry ingredients for a flux to be applied to a phosphor bronze electrode for operation on low open circuit voltage are listed in Table I below:

TABLE I

ALTERNATING CURRENT PHOSPHOR BRONZE ELECTRODE FLUX

| Dry Ingredients | Preferred Formula (Parts) | Range (Parts) |
|---|---|---|
| Calcium, barium and/or strontium carbonate | 45 | 15–60 |
| Iron carbonate | 6 | 2–12 |
| Calcium and/or sodium fluoride | 8 | 3–15 |
| Carbon (preferentially graphite) | 7 | 2–8 |
| Sodium and/or potassium carbonate | 3 | 0.5–6 |
| Alginate | 0.5 | 0.2–1.5 |
| Silica | 5 | 2–10 |
| Ferroboron | 20 | 5–30 |
| Ferrosilicon | 5 | 2–10 |

The invention will be more fully understood from the following example which is intended to be illustrative and not limiting.

EXAMPLE I

A flux is prepared from dry ingredients containing 15 parts of calcium carbonate, 33 parts of barium carbonate, 6 parts of iron carbonate, 8 parts of calcium fluoride, 7 parts of graphite, 2 parts of sodium carbonate, one part of potassium carbonate, 0.5 part of alginate, 5 parts of silica, 20 parts of ferroboron, and 5 parts of ferrosilicon. The powdered dry ingredients are blended and then mixed with 20 parts of sodium silicate of 41° Baume as a binder and extruded on phosphor bronze grade C core wires. The coated wires are baked at about 700° F. to produce electrodes with proportions as shown in Table II.

TABLE II

ELECTRODE CHARACTERISTICS

| Core Diameter | Electrode Outside Diameter | Coating % by wt. |
|---|---|---|
| 3/32" | 0.131" | 20.2 |
| ⅛" | 0.171" | 18 |
| 5/32" | 0.207" | 15.8 |
| 3/16" | 0.238" | 13.4 |

An electrode having a core wire of one-eighth inch grade C phosphor bronze and a flux coating prepared according to Example I above is connected to an alternating current welding supply operating on 60 cycle current, having an open circuit voltage of 50 volts. A weld of good contour and uniform appearance is applied to cast iron without arc interruption.

The chemical composition of the weld deposit is as follows:

| Carbon | 0.02 weight percent |
| Manganese | Trace |
| Silicon | 0.80 |
| Phosphorus | 0.25 |
| Sulfur | 0.001 |
| Tin | 8.2 |
| Iron | 1.1 |
| Copper | Remainder |

The tensile strength as determined in a 1-inch all-weld metal tensile specimen is about 57,000 p.s.i.

Although the present invention has been described with respect to certain specific embodiments, it is to be understood that variations and modifications in composition and proportion of ingredients may be made without departing from the spirit and scope of the invention defined in the appended claims.

I claim:

1. A coated arc welding electrode for operation on alternating current at an open circuit voltage of at least 50 volts comprising the combination of a wire core of phosphor bronze having less than about 1 percent lead and a flux coating consisting essentially of by weight of the coating from about 2 percent to about 8 percent carbon, up to about 60 percent by weight of the carbonates of the alkali metals and alkaline earth metals and wherein the alkaline earth metal carbonates include more than about 5 percent calcium carbonate and at least about 20 percent of material selected from the group consisting of barium carbonate, strontium carbonate and mixtures thereof, from about 3 percent to about 15 percent of a member selected from the group consisting of sodium fluoride, calcium fluoride and mixtures thereof and from about 2 percent to about 10 percent of a deoxidizer.

2. An electrode according to claim 1 wherein the flux contains from about 2 percent to about 12 percent iron carbonate, from about 0.5 percent to about 6 percent sodium carbonate, from about 2 percent to about 10 percent silica, from about 5 percent to about 30 percent ferroboron and wherein the deoxidizer is ferrosilicon.

3. An electrode according to claim 1 wherein the flux comprises from about 10 percent to about 25 percent of the electrode weight.

4. An electrode according to claim 1 wherein the phosphor bronze is an alloy selected from the grades consisting of A, C, D, and E as classified by the American Society for Metals in the Metals Handbook.

5. An electrode according to claim 1 wherein the core wire is an alloy consisting essentially of from about 1 percent to about 10 percent tin, less than about 0.4 percent phosphorus, less than about 0.25 percent manganese and the remainder copper.

* * * * *